(12) United States Patent
Jaiman et al.

(10) Patent No.: US 12,554,879 B2
(45) Date of Patent: Feb. 17, 2026

(54) SYSTEM AND METHOD OF PRESERVING USER PRIVACY AND CONFIDENTIAL INFORMATION ON EDGE DEVICES

(71) Applicant: THALES DIS CPL USA, INC., Austin, TX (US)

(72) Inventors: Yateendra Jaiman, Uttar Pradesh (IN); Asad Mahboob Ali, Austin, TX (US)

(73) Assignee: THALES DIS CPL USA, INC., Austin, TX (US)

( * ) Notice: Subject to any disclaimer, the term of this patent is extended or adjusted under 35 U.S.C. 154(b) by 177 days.

(21) Appl. No.: 18/378,227

(22) Filed: Oct. 10, 2023

(65) Prior Publication Data

US 2025/0117511 A1 Apr. 10, 2025

(51) Int. Cl.
*G06F 21/00* (2013.01)
*G06F 21/57* (2013.01)
*G06F 21/62* (2013.01)
*H04W 12/47* (2021.01)

(52) U.S. Cl.
CPC ........ *G06F 21/6245* (2013.01); *G06F 21/577* (2013.01); *H04W 12/47* (2021.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 7,054,614 B1* | 5/2006 | Hunzinger | ........ | H04M 1/72451 455/418 |
| 9,055,407 B1* | 6/2015 | Riemer | ............ | H04M 1/72454 |
| 9,104,886 B1* | 8/2015 | Dolbakian | ............. | G06F 21/62 |
| 10,805,012 B1* | 10/2020 | Li | ............ | H04W 4/80 |
| 11,438,452 B1* | 9/2022 | Abdollahian | ........... | H04W 4/80 |
| 2009/0115600 A1* | 5/2009 | Lee | ......................... | H04L 63/10 340/539.11 |

(Continued)

OTHER PUBLICATIONS

International Search Report (PCT/ISA/210) and Written Opinion (PCT/ISA/237) mailed on Feb. 10, 2025 by the European Patent Office as the International Searching Authority for corresponding International Application No. PCT/US2024/050310—[15 pages].

(Continued)

*Primary Examiner* — Shin-Hon (Eric) Chen

(57) ABSTRACT

A system or method for dynamically protecting a user's confidential information and a user's privacy at an edge device can include a plurality of sensors operatively coupled to the edge device, memory and one or more processors configured to perform certain operations. The operations can include aggregating signals from two or more sensors among the plurality of sensors via a sensor aggregator to provide an aggregated signal, setting policies via a policy agent that gives weighting factors to the two or more sensors and further assigns a security threshold level to one or more applications, calculating risks via a risk agent based on the policies set and readings from the two or more sensors, and orchestrating the sensor aggregator, the policy agent and the risk agent via a tracker application to modify a user interface interaction with each application operating on or via the edge device.

15 Claims, 5 Drawing Sheets

(56) References Cited

U.S. PATENT DOCUMENTS

| | | | | |
|---|---|---|---|---|
| 2012/0185910 | A1* | 7/2012 | Miettinen | H04L 63/107 |
| | | | | 726/1 |
| 2013/0340086 | A1 | 12/2013 | Blom | |
| 2014/0096261 | A1* | 4/2014 | Boldyrev | G06F 21/00 |
| | | | | 726/26 |
| 2015/0235050 | A1* | 8/2015 | Wouhaybi | G06F 16/955 |
| | | | | 726/28 |
| 2021/0097163 | A1* | 4/2021 | Efremov | G06F 21/6245 |
| 2022/0206924 | A1* | 6/2022 | Desserrey | G06F 3/0486 |
| 2023/0370452 | A1* | 11/2023 | Mannengal | H04L 41/12 |

OTHER PUBLICATIONS

Rahul Jain et al: "Contextual adaptive user interface for Android devices", 2013 Annual IEEE India Conference (INDICON), Dec. 1, 2013 (Dec. 1, 2013), pp. 1-5, XP055116257, DOI: 10.1109/INDCON. 2013.6726014; ISBN: 978-1.47-992274.1; abstract; p. 1, col. 1, paragraph 1-paragraph 3; figure 1; p. 1, col. 2, paragraph 2 • p. 2, col. 1; p. 2, col. 2, paragraph 8-p. 3, col. 1, paragraph 3; figure 2.

* cited by examiner

200

250

400

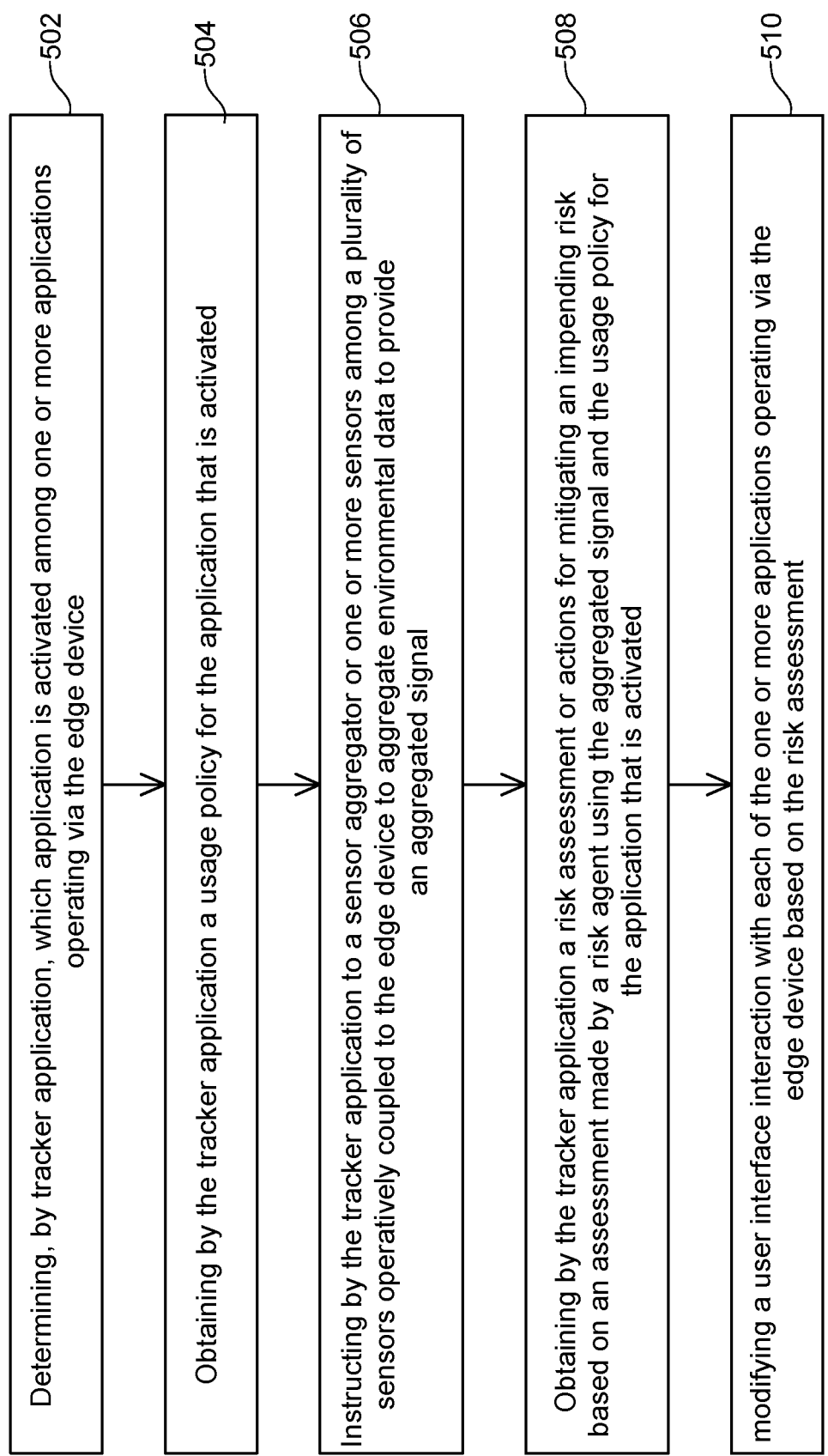

SYSTEM AND METHOD OF PRESERVING USER PRIVACY AND CONFIDENTIAL INFORMATION ON EDGE DEVICES

TECHNICAL FIELD

The present embodiments relates generally to management and configuration of edge devices, and more particularly, to a system and technique for dynamically preserving user privacy and confidential information on edge devices.

BACKGROUND

In today's digital age, privacy and security is incredibly important to users. If a user's identity is compromised it can have detrimental and far searching consequences. It can lead to monetary losses and damage to personal reputation. At the same time users consider digital edge devices such as smart phones an integral part of their lives. These devices allow us to remain connected with our friends, browse information at anytime from anywhere, and even conduct our business. While some interactions such as browsing for a movie timing are less sensitive, others like connecting to our bank and doing financial transaction, or reading confidential business documents require a higher level of security. Requiring a stronger user authentication credential, or forcing the user to connect from a trusted device often provides such security. However, even if the device is trusted, and the user has logged in with a strong authentication credential, there is still danger of information compromise if the environment in which the device used is not trusted or secure.

Protection of user privacy and data is generally addressed using two approaches. A first approach is applications-based. In this approach sensitive applications are treated differently, and require more strict access rules. In a second approach, a determination of the user environment is done through indirect measures, such as IP address or geo-location.

In both cases the solution is less than optimum. Overly restrictive in the first case, and not accurate enough in the second case.

All of the subject matter discussed in this Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

In some embodiments, a system for dynamically protecting a user's confidential information and a user's privacy at an edge device can include a plurality of sensors operatively coupled to the edge device, one or more processors, memory, and the plurality of sensors operatively coupled to the one or more processors, where the memory includes computer instructions that causes the one or more processors to perform certain operations. The operations can include aggregating signals from two or more sensors among the plurality of sensors via a sensor aggregator to provide an aggregated signal, setting policies via a policy agent that gives weighting factors to the two or more sensors and further assigns a security threshold level to one or more applications operating via the edge device, calculating risks via a risk agent based on the policies set and readings from the two or more sensors among the plurality of sensors, and orchestrating the sensor aggregator, the policy agent and the risk agent via a tracker application to modify a user interface interaction with each of the one or more applications operating via the edge device.

In some embodiments, the plurality of sensors includes two or more among a camera, an infra-red camera, a BlueTooth Sensor, a BlueTooth Low Energy (BLE) sensor, a Wi-Fi sensor, and a microphone.

In some embodiments the plurality of sensors includes two or more among a camera that helps with facial recognition and eyeball tracking, an infra-red camera that helps with precise eyeball tracking and presence detection of people in proximity, a Blue Tooth Sensor for detecting the presence of other Bluetooth devices in proximity, a Blue Tooth Low Energy (BLE) sensor for detecting the presence of other BLE devices in proximity, a Wi-Fi sensor for detection of other devices in proximity using Wi-Fi sniffers, and a microphone for sensing noise and human voice in proximity.

In some embodiments, the edge device is a smart phone.

In some embodiments, the plurality of sensors provides an indicator of proximity of third parties to determine if a surrounding area is safe for a given application.

In some embodiments, the edge device enables all applications to operate normally when the plurality of sensors provides the indicator of finding the surrounding area deemed to be safe.

In some embodiments, the edge device closes certain applications and otherwise limits certain applications to operate in a safe mode when the plurality of sensors provides the indicator that surrounding area is deemed unsafe.

In some embodiments, the tracker application is configured to determine what application is being opened by a user, obtain a usage policy for the opened application, obtain environment information from the sensor aggregator, and allow access or modify access based on a risk assessment by the risk agent.

In some embodiments, the risk agent is configured to assess a risk of using a given application based on a policy for the given application and further based on an environmental condition determined by collecting aggregated signals collected from the plurality of sensors, wherein the risk is communicated to the tracker application enabling the tracker application to manage or control the given application based on the risk assessed.

In some embodiments, the policy agent has a configurable sensor weight policy for a given application that enables different weighting values for each sensor measurement among the plurality of sensors.

In some embodiments, the system dynamically protects the privacy of the edge device user with direct and more accurate sensor data and where each application has its own configurable security threshold settings based on sensor detections for a surrounding environment enabling less restricted use in surrounding environments considered safe and more restricted use in surrounding environments considered unsafe while accounting for the sensitivity of each given application tracked by the tracker application.

In some embodiments, the system further comprises an artificial intelligence module for improving over time use based on inputs from one or more among the sensor aggregator, the risk agent or the policy agent. In some embodiments, the system can comprise a generative artificial intelligence module.

In some embodiments, a method for dynamically protecting a user's confidential information and a user's privacy at an edge device can include the steps of determining, by tracker application, which application is activated among one or more applications operating via the edge device, obtaining by the tracker application a usage policy for the application that is activated, instructing by the tracker application to a sensor aggregator or one or more sensors among a plurality of sensors operatively coupled to the edge device to aggregate environmental data to provide an aggregated signal, and obtaining by the tracker application a risk assessment or actions for mitigating an impending risk based on an assessment made by a risk agent using the aggregated signal and the usage policy for the application that is activated. In a separate example for some embodiments, the method can further include the step of modifying a user interface interaction with each of the one or more applications operating via the edge device based on the risk assessment.

In some embodiments, the method further includes the step of one or more of performing facial recognition and eyeball tracking using a camera, performing precise eyeball tracking and presence detection of people in proximity using an infra-red camera, detecting the presence of other Bluetooth devices in proximity using a Bluetooth sensor or a Bluetooth Low Energy (BLE) sensor, detecting other devices in proximity using a Wi-Fi sensor or Wi-Fi sniffer, and a sensing noise and human voice in proximity using a microphone.

In some embodiments, the edge device enables all applications to operate normally when the sensor aggregator provides an indicator of finding a surrounding area is deemed safe and where the edge device closes certain applications and otherwise limits certain applications to operate in a safe mode when the sensor aggregator provides an indicator that surrounding area is deemed unsafe.

In some embodiments, the tracker application determines what application is being opened by the edge device, obtains the usage policy for the opened application, obtains environment information from the sensor aggregator, and allows access or modifies access based on the risk assessment by the risk agent.

In some embodiments, the risk agent is configured to assess a risk of using a given application based on a policy for the given application and further based on an environmental condition determined by collecting aggregated signals collected from the plurality of sensors, where the risk is communicated to the tracker application enabling the tracker application to manage or control the given application based on the risk assessed.

In some embodiments, the policy agent enables different weighting values for each sensor measurement among the plurality of sensors using a configurable sensor weight policy user interface configurable for a given application.

In some embodiments, the method dynamically protects the privacy of the edge device user with direct and more accurate sensor data and where each application has its own configurable security threshold settings based on sensor detections for a surrounding environment enabling less restricted use in surrounding environments considered safe and more restricted use in surrounding environments considered unsafe while accounting for the sensitivity of each given application tracked by the tracker application.

In some embodiments, the method further uses an artificial intelligence module or a generative artificial intelligence module for improving over time use of the edge device based on inputs from one or more among the sensor aggregator, the risk agent or the policy agent.

BRIEF DESCRIPTION OF THE DRAWINGS

The accompanying drawings, which are incorporated in and constitute a part of this description, illustrate embodiments consistent with the embodiments and, together with the description, serve to explain the principles of the embodiments.

FIG. 5 illustrates another flow chart for a method for dynamically preserving user privacy and confidential information on edge devices in accordance with the embodiments.

Figure 1:
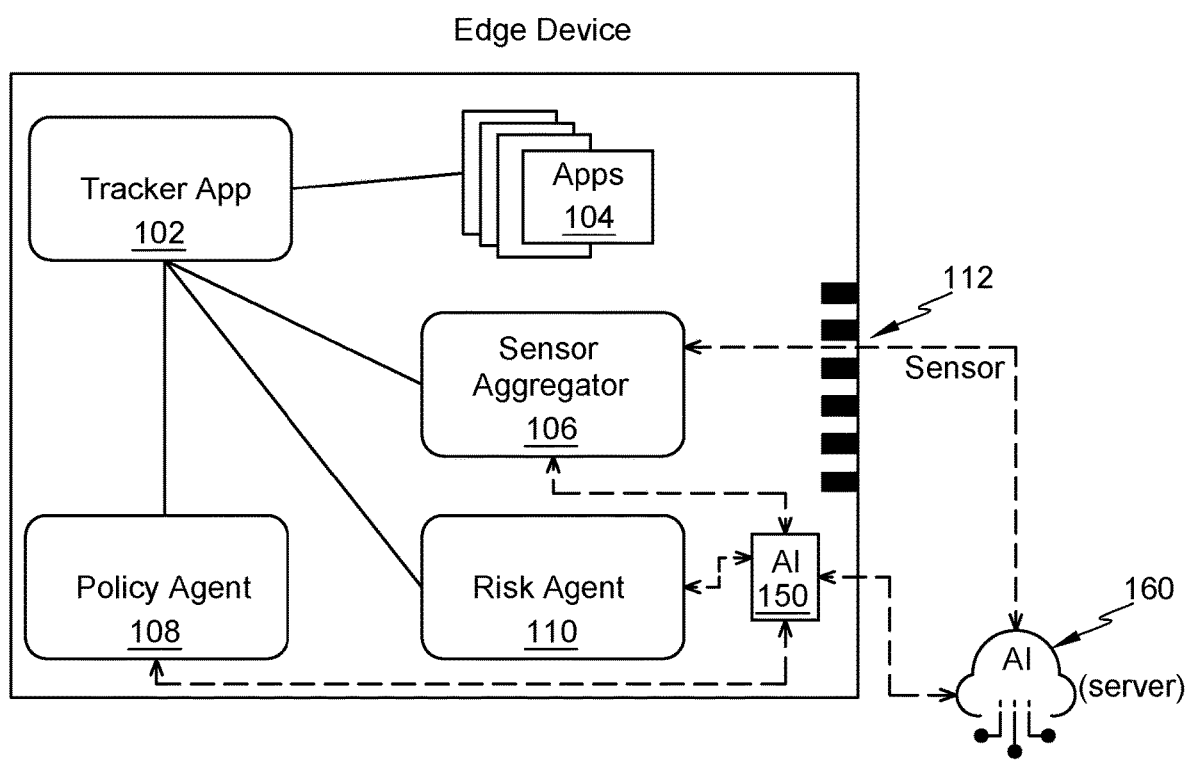
FIG. 1 illustrates a block diagram of an edge device in accordance with the embodiments.

Specific embodiments have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments. Instead, they are merely examples of apparatuses and methods consistent with aspects related to the embodiments as recited in the appended claims.

Edge devices such as mobile smart phones are meant for use in environments and surroundings that may not always be secure. For example, controlled environments like home or open sparsely populated park may be considered "private". However, the same cannot be said of environments such as public transport, airports, stadiums, trains, or other congested settings. In such places any information displayed on a smart phone screen can potentially be seen, heard, observed, and eventually captured by others. Blanket obfuscation of all text/content will not be viable since users in the interest of usability will override it, and therefore offer no meaningful security.

In the context of the present description, a mechanism can be used to detect when a particular application is open that accounts for the sensitivities required for such particular application (e.g., a banking application) and further accounts for current surroundings of the user's edge device where an insecure environment would warrant stricter security measures. Ideally, the embodiments will protect a user's privacy while accessing a mobile device in such environments with a much more direct and accurate assessment of the environment.

The embodiment allows for the creation and execution of context aware granular user privacy policies for edge devices by taking into account the current environment and surroundings in which the device is used. The embodiments are based on a combination of sensors that gather various signals, a mechanism to assign weight to these sensors, and a risk score agent that determines what action has to be taken for a particular application based upon its sensitivity and security threshold. The embodiments can use direct indicators for proximity of users to determine if the current surrounding is safe or not. In case the surroundings are considered safe, all applications on the edge device or smart phone will be allowed to function normally. However, if the surroundings are deemed unsafe (that is, if one or more additional observers are present, or potentially present), then based on a policy, certain sensitive applications will be closed, or their user interface will be restricted or constrained/blurred. Note that a smart phone is used as an example of an edge device and that the embodiments are not limited to smart phones. Other edge devices such as laptops, tablets, desktop computers, and other device are contemplated within the scope of the claims.

With reference to FIG. 1, a high level block view of an edge device 100 includes a number of building blocks including a tracker application 102, applications 104, a sensor aggregator 106, a policy agent 108, a risk agent 110, and a plurality of sensors 112. In some embodiments, an artificial intelligence module 150 can be included within the edge device 100 or alternatively an artificial intelligence module 170 can be remotely located inside a remote server 160 and operatively coupled to the edge device 100 as shown. In some embodiments, the artificial intelligence modules can be generative artificial intelligence modules. In yet other embodiments, the server 160 may or may not have any AI component.

A simple use of such a remote server 160 without an AI component can involve merely sending location and time information, and getting back a risk score where events are commonly scheduled. For example, if the location is Gillette Stadium in Foxborough MA, and the time is when the New England Patriots are playing a scheduled home game, the security risk will be high. Many people in the surrounding will be deemed unsafe. AI is not necessarily required for this assessment. Such assessment can be handled by simple programming logic.

However, there may be more subtle cases where the server 160 may have to rely on AI to send a response. For example, a college campus location that is normally deserted in the evening, but where a horde of students has gathered for an impromptu protest rally, resulting in a spike in cellular network traffic or SMS messaging. In such instance, AI as an optional module (170) inside the server 160 can serve the purpose of appropriately assessing the risk and recommending the appropriate corresponding actions to the user.

In some embodiments, the tracker application 102 can orchestrate the sensor aggregator 106, the policy agent 108, and risk agent 110 to determine how a user's interaction with each application will work. For example, in a crowded place the tracker app will offer users two choices: blur the screen, or close the screen. If however the surrounding environment is considered safe, no restrictions will be imposed on the use of that application.

In some embodiments, the sensor aggregator 106 aggregates signals from different sensors to make a more accurate assessment of the existence of third party interlopers or other security threats. The threats can be wireless or electronic threats or physical type threats such as over-the-shoulder snooping.

In some embodiments, the risk agent 110 calculates a risk score behind the scenes and on the basis of such risk assessment, it sends an alert notification to Tracker Application 102.

In some embodiments, the Policy Agent is a module that allows setting of policies. These policies determine what weight is given to which sensor, and which application has what security threshold.

In some embodiments, the edge device 100 includes an AI module 150 or the edge device 100 is operatively coupled to a remote AI module 170 that can reside or be part of a remote server 160. The AI module 150 could interface directly with the sensor aggregator 106 or additionally with or alternatively with the policy agent 108 and risk agent 110 as well. In some embodiments, the remote AI module 170 could be used to remotely analyze information from the sensors and/or sensor aggregator 106.

Figure 2A:
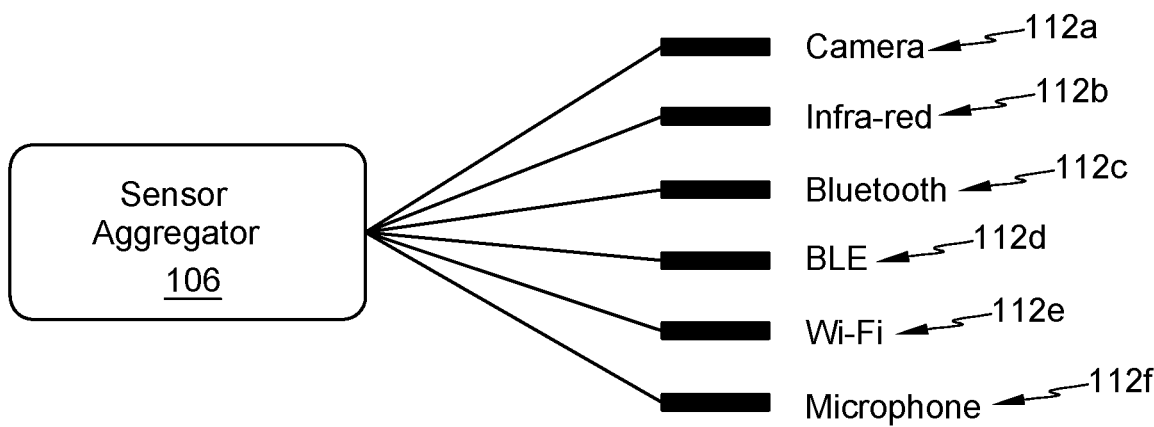
FIG. 2A depicts a sensor aggregator and corresponding sensors in accordance with the embodiments.

In some embodiments, the sensor aggregator 106 can include any number and any combination of sensors that can generate signals providing an indication of third parties or third party devices within proximity of the edge device that can be a potential threat to privacy or security. FIG. 2A illustrates an example of an environment 200 having some of the sensors that can be used for such purpose, but the embodiments are not limited to the sensors shown. Note also that each sensor can generate one or more types of signals.

The environment 200 and sensor aggregator 106 can receive signals from a camera 112a which can help with facial recognition, not only for the legitimate user of an application, but with additional faces that may be visible in the camera and thereby can see the edge device screen ("over the shoulder" peeking). The camera 112a can also help with eyeball tracking, to explicitly confirm that more than one person is looking at the screen or alternatively to explicitly confirm that only one person is looking at the screen.

The environment 200 and sensor aggregator 106 can receive signals from an infra-red sensor 112b that allows the system to track precise eyeball movements. The sensor 112b can also detect the presence of people in proximity.

The environment 200 and sensor aggregator 106 can receive signals from a Bluetooth sensor 112c that can detect the presence of other Bluetooth devices in the proximity. The presence of such devices implies presence of potential active users. A Bluetooth Low Energy (BLE) sensor 112d can work similarly to the Bluetooth sensor 112c, but generally operates with BLE compatible devices.

The environment 200 and sensor aggregator 106 can receive signals from a Wi-Fi sensor 112e that enables detection of other devices in proximity, but using Wi-Fi sniffers. The presence of such devices can also imply presence of potential active users.

The environment 200 and sensor aggregator 106 can receive signals from a microphone 112f. The microphone 112f can check for noise in general and human voices in particular. This is a direct indicator of the presence of potential active users in the vicinity of the edge device.

Figure 2B:
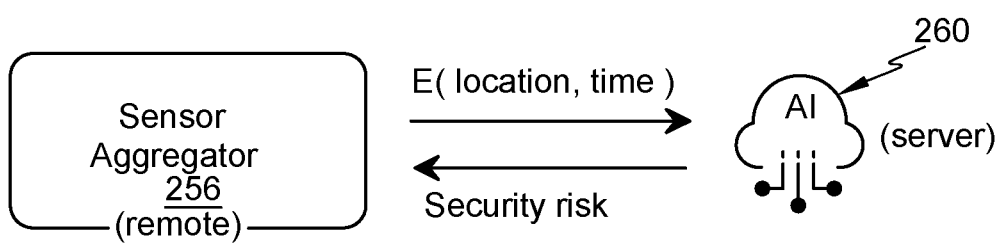
FIG. 2B illustrates a sensor aggregator with remote sensor in communication with a server in accordance with an embodiment.

Referring to FIG. 2B, a sensor aggregator 256 in an environment 250 can also operate in conjunction with a server 260 that uses artificial intelligence (AI) module 270. The sensor aggregator 256 and sever 270 can maintain a history of detections and make improved security risks assessments over time so that the edge device user can still obtain added privacy and security of confidential information while not overly limiting the practical use of the edge device. The remote AI module 270 can make adjustments to sensor weighting policies for certain applications running on or via the edge device. In another embodiment the sensor aggregator 256 can ask for simple risk score guidance from server 260, without relying on the AI module 270.

Figure 3:
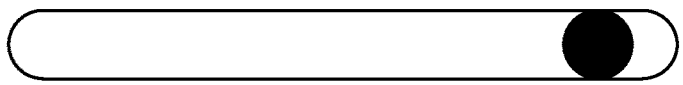
FIG. 3 illustrates a user interface for a sensor weighting policy that is configurable (by a user or administrator) in accordance with an embodiment.

FIG. 3 illustrates a user interface 300 where sensor weight policies can be adjusted for each application. In some embodiments, the sensor weight settings can be preset based on a general overall understanding of the assessments made by the various sensors used and the corresponding risks. For example, a camera and microphone signal might be more reliable in indicating a threat than a Wi-Fi or Bluetooth signal in certain instances. In some embodiments, an administrator can only adjust the sensor weight settings. In some other embodiments, the end user can adjust the sensor weight settings. In yet other settings, an AI and server can dynamically adjust the sensor weight settings using machine learning or other techniques.

Figure 4:
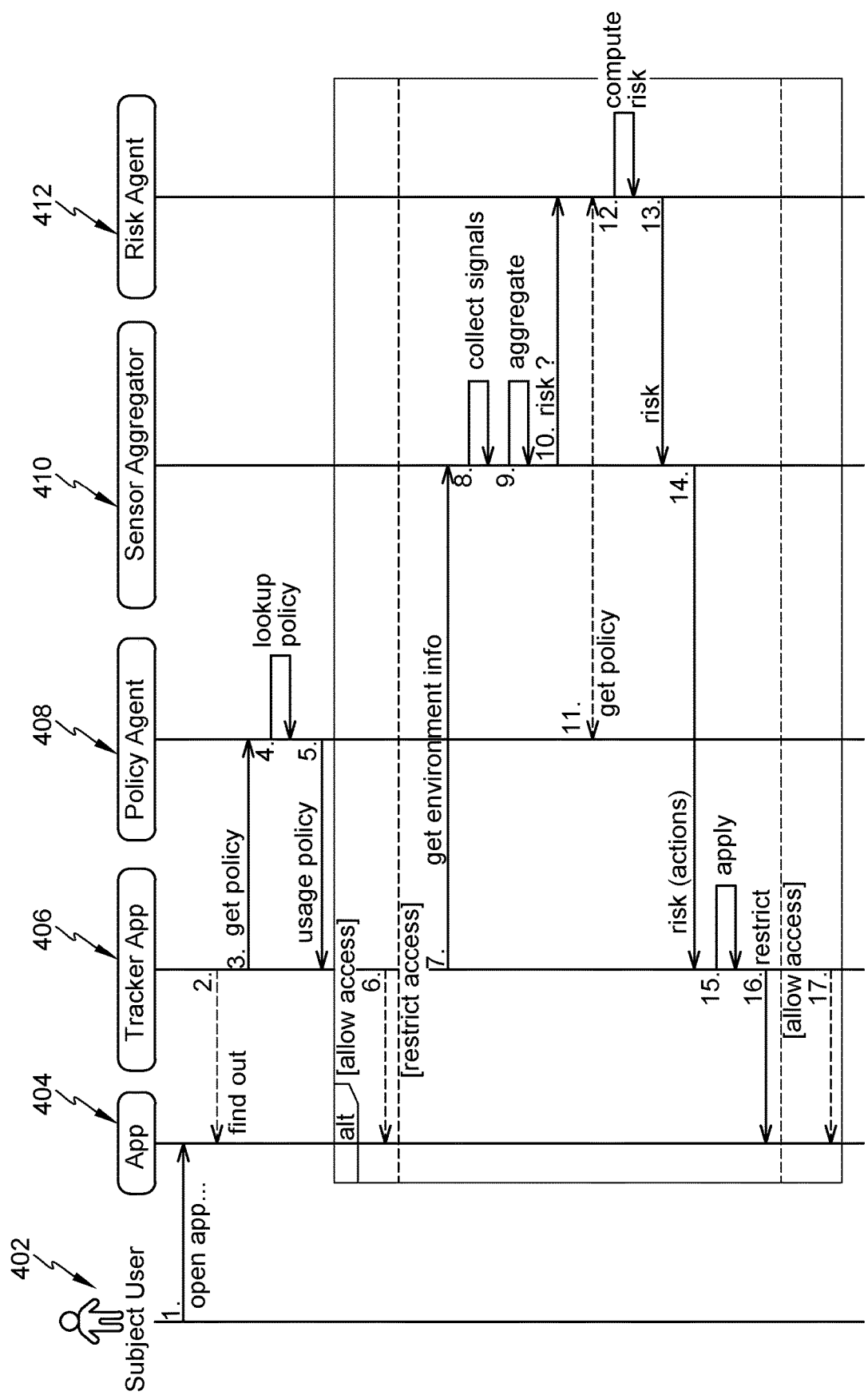
FIG. 4 is a flow diagram illustrating user activity and system responses in accordance with an embodiment.

FIG. 4 illustrates a flow diagram of a method 400 in accordance with the embodiments. The method 400 illustrates the steps a user 402 can take and the corresponding actions performed by the various system components to ensure that user privacy and data are not compromised. The steps include step 1 where the user 402 opens an application 404 on their edge device. It is assumed that the user 402 has already authenticated to the device, is authorized to use the application 404 and that the device is a trusted device. At step 2, a tracker application 406 picks up this intent to open the application 404. This will be followed up with an assessment of what steps to take next. This is done in the background without any explicit user involvement. At step 3, the tracker application 406 connects with a Policy Agent 408 to check what policy applies to the use of this application (404) by this user (402). User and App information is passed to Policy Agent. At step 4, the Policy Agent 408 looks up usage policy for given user and the Application or App. At step 5, the policy is then sent back to Tracker Application 406. At step 6, if the policy says access to this App is allowed under all circumstances, the Tracker App 406 implicitly allows opening of the App 404. No action is needed here. On the other hand, if the policy for this App 404 requires additional checks related to surrounding environments, then the flow diagram steps 7 to 15 follow.

At step 7, the Tracker App 406 asks the Sensor Aggregator 410 to determine what environment the user is currently working in, and how this environment can impact the user's privacy. At step 8, the sensor aggregator 410 gets signals from each of the sensors (see FIG. 2A and FIG. 2B). At step 9, the sensor aggregator 410 then consolidates these signals. At step 10, the consolidated set of signals is sent to a Risk Agent 412. The intent is to translate the information in these signals into a risk score. However, this translation is not possible without knowing how much weight should be given to each of the signals. For this information, the Risk Agent 412 interacts with the Policy Agent 408 at step 11. As a result of this interaction, the policy regarding weight of specific sensors is sent back to the policy agent.

At step 12, based on the sensor information received in step 10 and policy information received in step 11, the Risk Agent 412 computes a risk score. Using this risk score, the risk agent 412 determines what action should be taken and passes it to Sensor Aggregator 410 at step 13. At step 14, this action is then forwarded to the Tracker App 406. At step 15, the Tracker App 406 now implements this action. This is done in either step #16 or #17.

At step 16, in the case the environment is not considered safe (e.g., if one or more persons, other than actual user, are present in the vicinity of the device) the Tracker App 406 will take measures to restrict the use of Application 404. These measures can include blocking the App completely, blurring the display, or asking the user if they want to proceed. What action to take is part of the message in step 14. Alternatively, at step 17, if the environment is considered safe and no action is required, the Tracker App 406 allows the use of App 404.

In some embodiments, a method 500 for dynamically protecting a user's confidential information and a user's privacy at an edge device as shown in FIG. 5 can include the step 502 of determining, by a tracker application, which application is activated among one or more applications operating via the edge device, the step 504 of obtaining by the tracker application a usage policy for the application that is activated, and the step 506 of instructing by the tracker application to a sensor aggregator or one or more sensors among a plurality of sensors operatively coupled to the edge device to aggregate environmental data to provide an aggregated signal. The method 500 can further include the step 508 of obtaining by the tracker application a risk assessment or actions for mitigating an impending risk based on an assessment made by a risk agent using the aggregated signal and the usage policy for the application that is activated. In some embodiments, the method 500 further includes the step 510 of modifying a user interface interaction with each of the one or more applications operating via the edge device based on the risk assessment.

In some embodiments, the method 500 further includes the step of one or more of performing facial recognition and eyeball tracking using a camera, performing precise eyeball tracking and presence detection of people in proximity using an infra-red camera, detecting the presence of other Bluetooth devices in proximity using a Bluetooth sensor or a Bluetooth Low Energy (BLE) sensor, detecting other devices in proximity using a Wi-Fi sensor or Wi-Fi sniffer, and a sensing noise and human voice in proximity using a microphone.

In some embodiments, the edge device enables all applications to operate normally when the sensor aggregator provides an indicator of finding a surrounding area is deemed safe and where the edge device closes certain applications and otherwise limits certain applications to operate in a safe mode when the sensor aggregator provides an indicator that surrounding area is deemed unsafe.

In some embodiments, the tracker application determines what application is being opened by the edge device (see Step 2, FIG. 4), obtains the usage policy for the opened application (see Step 5, FIG. 4), obtains environment information from the sensor aggregator (see Step 7, FIG. 4), and allows access or modifies access (see Steps 16 and/or 17, FIG. 4) based on the risk assessment by the risk agent.

In some embodiments, the risk agent is configured to assess a risk (see Step 12, FIG. 4) of using a given application based on a policy for the given application and further based on an environmental condition determined by collecting aggregated signals collected from the plurality of sensors, where the risk is communicated to the tracker application enabling the tracker application to manage or control the given application based on the risk assessed (see Steps 13, 14, and 15 of FIG. 4).

In some embodiments, the policy agent enables different weighting values for each sensor measurement among the plurality of sensors using a configurable sensor weight policy user interface (see user interface 300 of FIG. 3) configurable for a given application.

In some embodiments, the method dynamically protects the privacy of the edge device user with direct and more accurate sensor data and where each application has its own configurable security threshold settings based on sensor detections for a surrounding environment enabling less restricted use in surrounding environments considered safe and more restricted use in surrounding environments considered unsafe while accounting for the sensitivity of each given application tracked by the tracker application.

In some embodiments, the method further uses an artificial intelligence module (see 160, FIG. 1 or 270, FIG. 2B) for improving over time use of the edge device based on inputs from one or more among the sensor aggregator, the risk agent or the policy agent.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed, is:

1. A system for dynamically protecting confidential information and privacy of a user at an edge device, comprising:
 a plurality of sensors operatively coupled to the edge device;
 one or more processors, memory, and the plurality of sensors operatively coupled to the one or more processors, wherein the memory includes computer instructions which when executed by the one or more processors causes the one or more processors to perform the operations of:
  aggregating signals from two or more sensors among the plurality of sensors via a sensor aggregator to provide an aggregated signal;
  setting, via a policy agent, one or more application-specific policies for one or more applications operating via the edge device, wherein each application-specific policy corresponds to a respective application and assigns weighting factors to the two or more sensors and a security threshold level for the respective application;
  dynamically adjusting, via an Artificial Intelligence (AI) module and based on historical sensor data, the weighting factors assigned in the application-specific policies for the two or more sensors;
  calculating risks, via a risk agent, based on the application-specific policies and the aggregated signal; and
  orchestrating the sensor aggregator, the policy agent and the risk agent, via a tracker application, to modify a user interface interaction with each of the one or more applications operating via the edge device,
  whereby the AI module dynamically adjusts sensor weight settings so as to visually modify the interaction of the user interface for each respective application according to a risk assessment of the calculated risks.

2. The system of claim 1, wherein the plurality of sensors comprises two or more among a camera, an infra-red camera, a BlueTooth Sensor, a BlueTooth Low Energy (BLE) sensor, a Wi-Fi sensor, and a microphone.

3. The system of claim 1, wherein the plurality of sensors comprises two or more among a camera that helps with facial recognition and eyeball tracking, an infra-red camera that helps with precise eyeball tracking and presence detection of people in proximity, a Blue Tooth Sensor for detecting the presence of other Bluetooth devices in proximity, a Blue Tooth Low Energy (BLE) sensor for detecting the presence of other BLE devices in proximity, a Wi-Fi sensor for detection of other devices in proximity using Wi-Fi sniffers, and a microphone for sensing noise and human voice in proximity.

4. The system of claim 1, wherein the edge device is a smart phone, and
 wherein the plurality of sensors provides an indicator of proximity of third parties to determine if a surrounding area is safe for a given application.

5. The system of claim 4, wherein the edge device enables all applications to operate normally when the plurality of sensors provides the indicator of finding the surrounding area deemed to be safe, and
 wherein the edge device closes certain applications and otherwise limits certain applications to operate in a restricted mode when the plurality of sensors provides the indicator that surrounding area is deemed unsafe.

6. The system of claim 1, wherein the tracker application is configured to determine what application is being opened by a user, obtain an application-specific policy for the opened application, obtain environment information from the sensor aggregator, and allow access or modify access based on the risk assessment by the risk agent.

7. The system of claim 1, wherein the risk agent is configured to assess a risk of using a given application based on an application-specific policy for the given application and further based on an environmental condition determined by collecting aggregated signals collected from the plurality of sensors, wherein the risk is communicated to the tracker application enabling the tracker application to manage or control the given application based on the risk assessed.

8. The system of claim 1, wherein
 the artificial intelligence module is configured to improve over time, based on inputs from one or more among the sensor aggregator, the risk assessment by way of the risk agent or the policy agent.

9. The system of claim 1, wherein the system dynamically protects the privacy of the edge device user with direct and more accurate sensor data, and wherein each application has its own configurable security threshold settings based on sensor detections for a surrounding environment enabling less restricted use in surrounding environments considered safe and more restricted use in surrounding environments considered unsafe while accounting for the sensitivity of each given application tracked by the tracker application.

10. A method for dynamically protecting a user's confidential information and privacy of a user at an edge device, comprising:
   determining, by a tracker application, which application is activated among one or more applications operating via the edge device;
   obtaining, by the tracker application, a usage policy for the application that is activated, the usage policy being distinctive to the activated application and assigning weighting factors to two or more sensors among a plurality of sensors operatively coupled to the edge device and further assigning a security threshold level for the activated application;
   instructing, by the tracker application, to a sensor aggregator or the one or more sensors among the plurality of sensors operatively coupled to the edge device to aggregate environmental data to provide an aggregated signal;
   dynamically adjusting, by an Artificial Intelligence (AI) module and based on historical sensor data, the weighting factors assigned in the usage policy;
   obtaining, by the tracker application, a risk assessment or actions for mitigating an impending risk based on an assessment made by a risk agent using the aggregated signal and the usage policy for the application that is activated; and
   modifying a user interface interaction with the activated application operating via the edge device based on the risk assessment,
   whereby the AI module dynamically adjusts sensor weight settings so as to visually modify the interaction of the user interface for each respective application according to a risk assessment of the calculated risks.

11. The method of claim 10, wherein the method further comprises the step of one or more of performing facial recognition and eyeball tracking using a camera, performing precise eyeball tracking and presence detection of people in proximity using an infra-red camera, detecting the presence of other Bluetooth devices in proximity using a Bluetooth sensor or a Bluetooth Low Energy (BLE) sensor, detecting other devices in proximity using a Wi-Fi sensor or Wi-Fi sniffer, and a sensing noise and human voice in proximity using a microphone.

12. The method of claim 10, wherein the edge device enables all applications to operate normally when the sensor aggregator provides an indicator of finding a surrounding area is deemed safe and wherein the edge device closes certain applications and otherwise limits certain applications to operate in a restricted mode when the sensor aggregator provides an indicator that surrounding area is deemed unsafe.

13. The method of claim 10, wherein the tracker application determines what application is being opened by the edge device, obtains the usage policy for the opened application, obtains environment information from the sensor aggregator, and allows access or modifies access based on the risk assessment by the risk agent,
   wherein the risk agent is configured to assess a risk of using the given application based on the usage policy for the given application and further based on an environmental condition determined by collecting aggregated signals collected from the plurality of sensors, wherein the risk is communicated to the tracker application enabling the tracker application to manage or control the given application based on the risk assessed,
   wherein the policy agent enables different weighting values for each sensor measurement among the plurality of sensors using a configurable sensor weight policy user interface configurable for the given application.

14. The method of claim 10, wherein the method dynamically protects the privacy of the edge device user with direct and more accurate sensor data, and wherein each application has its own configurable security threshold settings based on sensor detections for a surrounding environment enabling less restricted use in surrounding environments considered safe and more restricted use in surrounding environments considered unsafe while accounting for the sensitivity of each given application tracked by the tracker application.

15. The method of claim 10, wherein the artificial intelligence module is configured for improving over time based on inputs from one or more among the sensor aggregator, the risk agent or the policy agent.

* * * * *